United States Patent
Karatal et al.

(10) Patent No.: US 8,312,422 B2
(45) Date of Patent: Nov. 13, 2012

(54) PROGRAMMING INTERFACE FOR A COMPUTER PLATFORM

(75) Inventors: Kerem B. Karatal, Bellevue, WA (US); Marc M. Miller, Redmond, WA (US); Michael G. Sheldon, Seattle, WA (US); Timothy P. McKee, Seattle, WA (US); Chris J. Guzak, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 238 days.

(21) Appl. No.: 12/356,452

(22) Filed: Jan. 20, 2009

(65) Prior Publication Data

US 2009/0125822 A1 May 14, 2009

Related U.S. Application Data

(63) Continuation of application No. 10/693,718, filed on Oct. 24, 2003, now Pat. No. 7,493,592.

(51) Int. Cl.
*G06F 9/44* (2006.01)
*G06F 3/048* (2006.01)

(52) U.S. Cl. ........ 717/105; 717/109; 717/113; 715/779; 715/826; 715/838

(58) Field of Classification Search ........................ None
See application file for complete search history.

(56) References Cited

U.S. PATENT DOCUMENTS

| | | | |
|---|---|---|---|
| 5,689,700 A | 11/1997 | Miller et al. | |
| 5,689,701 A | 11/1997 | Ault et al. | |
| 5,842,214 A | 11/1998 | Whitney et al. | |
| 5,903,753 A | 5/1999 | Bramnick et al. | |
| 5,933,599 A | 8/1999 | Nolan | |
| 6,094,706 A | 7/2000 | Factor et al. | |
| 6,243,724 B1 | 6/2001 | Mander et al. | |
| 6,446,253 B1 | 9/2002 | Mellmer | |
| 6,613,101 B2 | 9/2003 | Mander et al. | |
| 6,968,438 B1 | 11/2005 | Russo et al. | |
| 7,020,697 B1 | 3/2006 | Goodman et al. | |
| 7,185,290 B2* | 2/2007 | Cadiz et al. | 715/838 |
| 7,343,567 B2* | 3/2008 | Mann et al. | 715/826 |
| 7,493,592 B2* | 2/2009 | Karatal et al. | 717/105 |
| 7,669,140 B2* | 2/2010 | Matthews et al. | 715/779 |
| 8,176,466 B2* | 5/2012 | Tristram | 717/105 |

(Continued)

FOREIGN PATENT DOCUMENTS

JP 09330214 12/1997

(Continued)

OTHER PUBLICATIONS

Tsang et al., Temporal Thumbnails: rapid visualization of time-based viewing data, May 2004, 4 pages, <http://delivery.acm.org/10.1145/990000/989890/p175-tsang.pdf>.*

(Continued)

*Primary Examiner* — Thuy Dao
(74) *Attorney, Agent, or Firm* — Lee & Hayes, PLLC

(57) ABSTRACT

A programming interface for a computer platform can include various functionality. In certain embodiments, the programming interface includes one or more of a first group of services related to re-usable user interface controls, a second group of services related to user interface dialogs and user interface wizards, a third group of services related to extending the user interface functionality, and a fourth group of services related to extending functionality of a desktop of the user interface.

22 Claims, 9 Drawing Sheets

U.S. PATENT DOCUMENTS

| | | | |
|---|---|---|---|
| 2002/0186257 A1* | 12/2002 | Cadiz et al. | 345/838 |
| 2003/0028685 A1 | 2/2003 | Smith et al. | |
| 2003/0081011 A1* | 5/2003 | Sheldon et al. | 345/838 |
| 2003/0084209 A1 | 5/2003 | Chadalapaka | |
| 2003/0177282 A1 | 9/2003 | Hejlsberg et al. | |

FOREIGN PATENT DOCUMENTS

| | | |
|---|---|---|
| JP | 2000163490 A | 6/2000 |
| JP | 2003169372 | 6/2003 |
| JP | 2003174598 | 6/2003 |
| JP | 2003248647 | 9/2003 |
| RU | 2127019 C1 | 2/1999 |
| WO | WO0195107 A2 | 12/2001 |

OTHER PUBLICATIONS

A. Feng, Towards real-time enabled Microsoft Windows, Sep. 2005, 5 pages, <http://delivery.acm.org/10.1145/1090000/1086256/p142-feng.pdf>.*

A. Wolfe, Longhorn Ties Platform Apps to Core Operating System, Sep. 2004, 3 pages, <http://delivery.acm.org/10.1145/1030000/1028907/wolfe.pdf>.*

Yamaguchi, "Java Language, What is the Problem? 5. JavaBeans and Componentware", J. Info. Proc. Soc. Jap., vol. 39, No. 4, Apr. 15, 1998, pp. 307-307.

KROfficeAction.

Cadiz, et al., "Sideshow: Providing Peripheral Awareness of Important Information", MSR-TR, 2001, 9 pgs.

Myers, et al., "Past, Present, and Future of User Interface Software Tools", ACM Transactions on Computer-Human Interaction, vol. 7, No. 1, Mar. 2000, pp. 3-28.

"Sample Chapter from 'Microsoft Windows 2000 Professional, Step by Step'", Lesson 3: Managing Files and Folders, May 1, 2000, retrieved from the internet at <<http://www.microsoft.com/mspress/books/sampchap/1589.asp>> on Jun. 12, 2006, 12 pgs.

"Windows XP—Reviewers Guide", Microsoft Corporation, 2001, 61 pgs.

Official Action from the Patent Office of the Russian Federation for Application No. 2004127215/09(029517), mailed on Nov. 7, 2008, 12 pages.

Official Decision of Grant from the Patent Office of the Russian Federation for Application No. 2004127215/09 (029517), mailed on Feb. 12, 2009, 18 pages.

Translated the Japanese Office Action mailed Jul. 22, 2011 for Japanese patent application No. 2004-264627, a counterpart foreign application of US patent No. 7,493,592.

Translated the Japanese Office Action mailed Apr. 5, 2011 for Japanese Patent Application No. 2004-264627, a counterpart foreign application of US Patent No. 7,493,592.

The Canadian Office Action mailed May 17, 2011 for Canadian Patent Application No. 2481552, a counterpart foreign application of US Patent No. 7,493,592.

The Mexican Office Action mailed May 17, 2011 for Mexican patent application No. PA/a/2004/008851, a counterpart foreign application of US patent No. 7,493,592.

Translated the Japanese Office Action mailed Nov. 18, 2011 for Japanese patent application No. 2004-264627, a counterpart foreign application of US patent No. 7,493,592, 6 pages.

Cadiz, et al., "Designing and Deploying an Information Awareness Interface", Technical Report MSR-TR-2002-87, Microsoft Research, Redmond, WA, USA, Aug. 20, 2002, 11 pages.

* cited by examiner

PROGRAMMING INTERFACE FOR A COMPUTER PLATFORM

RELATED APPLICATIONS

This continuation application claims priority to commonly assigned co-pending U.S. patent application Ser. No. 10/693,718, U.S. Patent Publication No. 2005-0091670-A1, entitled "Programming Interface for a Computer Platform" for Kerem Karatal, Mike Sheldon, Marc Miller, Chris Guzak, and Tim McKee, filed on Oct. 24, 2003, which are incorporated by reference herein for all that it teaches and discloses.

TECHNICAL FIELD

This invention relates to software and to development of such software. More particularly, this invention relates to a programming interface that facilitates use of a software platform by application programs and computer hardware.

BRIEF DESCRIPTION OF ACCOMPANYING COMPACT DISCS

Accompanying this specification is a set of three compact discs that stores a Software Development Kit (SDK) for the Microsoft® Windows® Code-Named "Longhorn" operating system. The SDK contains documentation for the Microsoft® Windows® Code-Named "Longhorn" operating system. Duplicate copies of each of these three compact discs also accompany this specification.

The first compact disc in the set of three compact discs (CD 1 of 3) includes a file folder named "lhsdk" that was created on Oct. 22, 2003; it is 586 Mbytes in size, contains 9,692 sub-folders, and contains 44,292 sub-files. The second compact disc in the set of three compact discs (CD 2 of 3) includes a file folder named "ns" that was created on Oct. 22, 2003; it is 605 Mbytes in size, contains 12,628 sub-folders, and contains 44,934 sub-files. The third compact disc in the set of three compact discs (CD 3 of 3) includes a file folder named "ns" that was created on Oct. 22, 2003; it is 575 Mbytes in size, contains 9,881 sub-folders, and contains 43,630 sub-files. The files on each of these three compact discs can be executed on a Windows®-based computing device (e.g., IBM-PC, or equivalent) that executes a Windows®-brand operating system (e.g., Windows® NT, Windows® 98, Windows® 2000, Windows® XP, etc.). The files on each compact disc in this set of three compact discs are hereby incorporated by reference.

Each compact disc in the set of three compact discs itself is a CD-R, and conforms to the ISO 9660 standard. The contents of each compact disc in the set of three compact discs is in compliance with the American Standard Code for Information Interchange (ASCII).

BACKGROUND

Very early on, computer software came to be categorized as "operating system" software or "application" software. Broadly speaking, an application is software meant to perform a specific task for the computer user such as solving a mathematical equation or supporting word processing. The operating system is the software that manages and controls the computer hardware. The goal of the operating system is to make the computer resources available to the application programmer while at the same time, hiding the complexity necessary to actually control the hardware.

The operating system makes the resources available via functions that are collectively known as the Application Program Interface or API. The term API is also used in reference to a single one of these functions. The functions are often grouped in terms of what resource or service they provide to the application programmer. Application software requests resources by calling individual API functions. API functions also serve as the means by which messages and information provided by the operating system are relayed back to the application software.

In addition to changes in hardware, another factor driving the evolution of operating system software has been the desire to simplify and speed application software development. Application software development can be a daunting task, sometimes requiring years of developer time to create a sophisticated program with millions of lines of code. For a popular operating system such as various versions of the Microsoft Windows® operating system, application software developers write thousands of different applications each year that utilize the operating system. A coherent and usable operating system base is required to support so many diverse application developers.

Often, development of application software can be made simpler by making the operating system more complex. That is, if a function may be useful to several different application programs, it may be better to write it once for inclusion in the operating system, than requiring dozens of software developers to write it dozens of times for inclusion in dozens of different applications. In this manner, if the operating system supports a wide range of common functionality required by a number of applications, significant savings in applications software development costs and time can be achieved.

Regardless of where the line between operating system and application software is drawn, it is clear that for a useful operating system, the API between the operating system and the computer hardware and application software is as important as efficient internal operation of the operating system itself.

Over the past few years, the universal adoption of the Internet, and networking technology in general, has changed the landscape for computer software developers. Traditionally, software developers focused on single-site software applications for standalone desktop computers, or LAN-based computers that were connected to a limited number of other computers via a local area network (LAN). Such software applications were typically referred to as "shrink wrapped" products because the software was marketed and sold in a shrink-wrapped package. The applications utilized well-defined APIs to access the underlying operating system of the computer.

As the Internet evolved and gained widespread acceptance, the industry began to recognize the power of hosting applications at various sites on the World Wide Web (or simply the "Web"). In the networked world, clients from anywhere could submit requests to server-based applications hosted at diverse locations and receive responses back in fractions of a second. These Web applications, however, were typically developed using the same operating system platform that was originally developed for standalone computing machines or locally networked computers. Unfortunately, in some instances, these applications do not adequately transfer to the distributed computing regime. The underlying platform was simply not constructed with the idea of supporting limitless numbers of interconnected computers.

To accommodate the shift to the distributed computing environment being ushered in by the Internet, Microsoft Corporation developed a network software platform known as the ".NET" Framework (read as "Dot Net"). Microsoft® .NET is software for connecting people, information, systems, and devices. The platform allows developers to create Web services that will execute over the Internet. This dynamic shift was accompanied by a set of API functions for Microsoft's .NET™ Framework.

As use of the .NET™ Framework has become increasingly common, ways to increase the efficiency and/or performance of the platform have been identified. The inventors have developed a unique set of programming interface functions to allow for such increased efficiency and/or performance.

SUMMARY

A programming interface for a computer platform is described herein.

In accordance with certain aspects, the programming interface can include one or more of the following groups of services: a first group of services related to re-usable user interface controls, a second group of services related to user interface dialogs and user interface wizards, a third group of services related to extending the user interface functionality, and a fourth group of services related to extending functionality of a desktop of the user interface.

BRIEF DESCRIPTION OF THE DRAWINGS

The same numbers are used throughout the drawings to reference like features.

DETAILED DESCRIPTION

This disclosure addresses a programming interface, such as an application program interface (API), for a network platform upon which developers can build Web applications and services. More particularly, an exemplary API is described for operating systems that make use of a network platform, such as the .NET™ Framework created by Microsoft Corporation. The .NET™ Framework is a software platform for Web services and Web applications implemented in the distributed computing environment. It represents the next generation of Internet computing, using open communication standards to communicate among loosely coupled Web services that are collaborating to perform a particular task.

In the described implementation, the network platform utilizes XML (extensible markup language), an open standard for describing data. XML is managed by the World Wide Web Consortium (W3C). XML is used for defining data elements on a Web page and business-to-business documents. XML uses a similar tag structure as HTML; however, whereas HTML defines how elements are displayed, XML defines what those elements contain. HTML uses predefined tags, but XML allows tags to be defined by the developer of the page. Thus, virtually any data items can be identified, allowing Web pages to function like database records. Through the use of XML and other open protocols, such as Simple Object Access Protocol (SOAP), the network platform allows integration of a wide range of services that can be tailored to the needs of the user. Although the embodiments described herein are described in conjunction with XML and other open standards, such are not required for the operation of the claimed invention. Other equally viable technologies will suffice to implement the inventions described herein.

As used herein, the phrase application program interface or API includes traditional interfaces that employ method or function calls, as well as remote calls (e.g., a proxy, stub relationship) and SOAP/XML invocations.

Exemplary Network Environment

Figure 1:
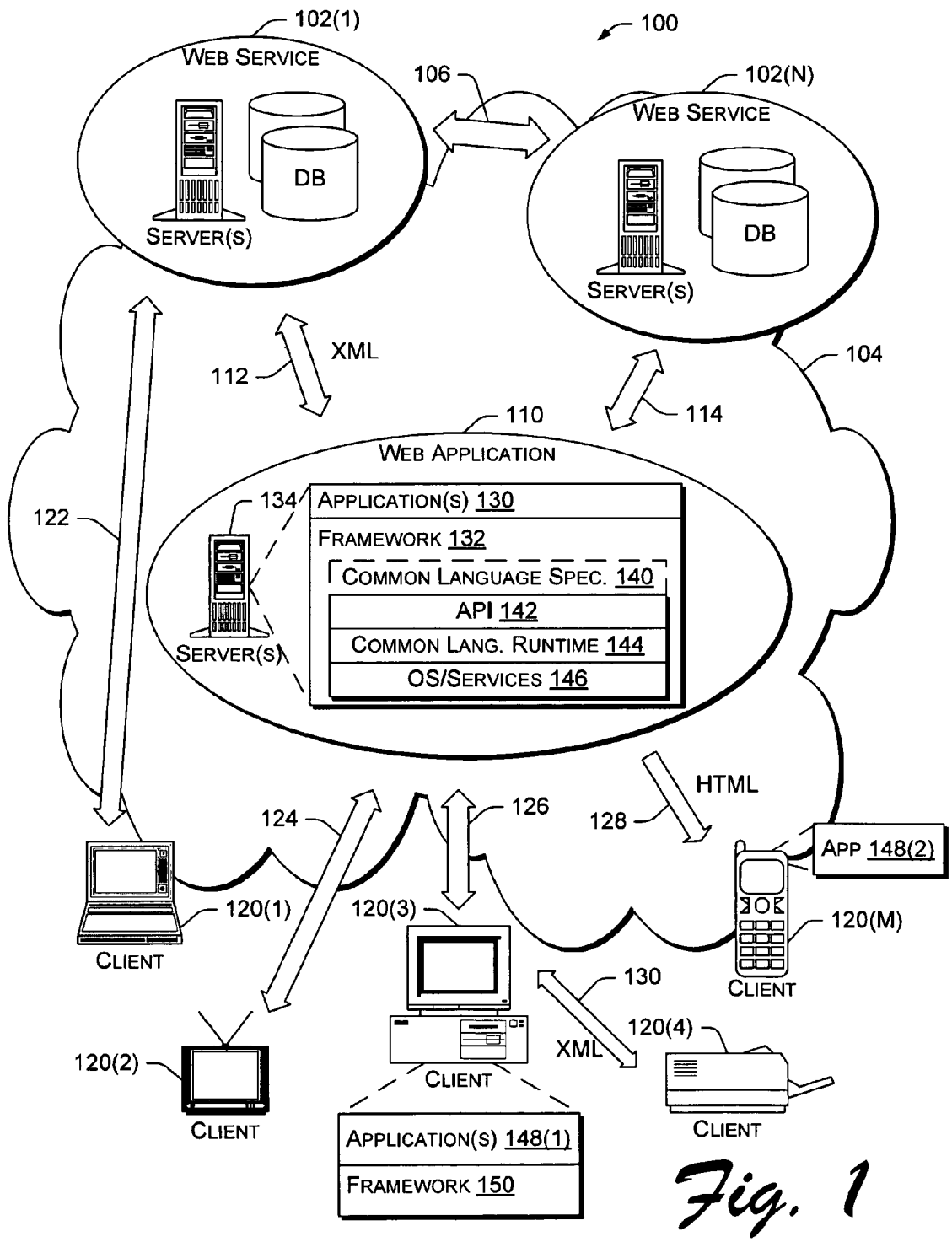
FIG. 1 illustrates a network architecture in which clients access Web services over the Internet using conventional protocols.

FIG. 1 shows a network environment 100 in which a network platform, such as the .NET™ Framework, may be implemented. The network environment 100 includes representative Web services 102(1), ..., 102(N), which provide services that can be accessed over a network 104 (e.g., Internet). The Web services, referenced generally as number 102, are programmable application components that are reusable and interact programmatically over the network 104, typically through industry standard Web protocols, such as XML, SOAP, WAP (wireless application protocol), HTTP (hypertext transport protocol), and SMTP (simple mail transfer protocol) although other means of interacting with the Web services over the network may also be used, such as Remote Procedure Call (RPC) or object broker type technology. A Web service can be self-describing and is often defined in terms of formats and ordering of messages.

Web services 102 are accessible directly by other services (as represented by communication link 106) or a software application, such as Web application 110 (as represented by communication links 112 and 114). Each Web service 102 is illustrated as including one or more servers that execute software to handle requests for particular services. Such services often maintain databases that store information to be served back to requesters. Web services may be configured to perform any one of a variety of different services. Examples of Web services include login verification, notification, database storage, stock quoting, location directories, mapping, music, electronic wallet, calendar/scheduler, telephone listings, news and information, games, ticketing, and so on. The Web services can be combined with each other and with other applications to build intelligent interactive experiences.

The network environment 100 also includes representative client devices 120(1), 120(2), 120(3), 120(4), ..., 120(M) that utilize the Web services 102 (as represented by communication link 122) and/or the Web application 110 (as represented by communication links 124, 126, and 128). The clients may communicate with one another using standard protocols as well, as represented by an exemplary XML link 130 between clients 120(3) and 120(4).

The client devices, referenced generally as number 120, can be implemented many different ways. Examples of possible client implementations include, without limitation, portable computers, stationary computers, tablet PCs, televisions/set-top boxes, wireless communication devices, personal digital assistants, gaming consoles, printers, photocopiers, and other smart devices.

The Web application 110 is an application designed to run on the network platform and may utilize the Web services 102 when handling and servicing requests from clients 120. The Web application 110 is composed of one or more software applications 130 that run atop a programming framework 132, which are executing on one or more servers 134 or other computer systems. Note that a portion of Web application 110 may actually reside on one or more of clients 120. Alternatively, Web application 110 may coordinate with other software on clients 120 to actually accomplish its tasks.

The programming framework 132 is the structure that supports the applications and services developed by application developers. It permits multi-language development and seamless integration by supporting multiple languages. It supports open protocols, such as SOAP, and encapsulates the underlying operating system and object model services. The framework provides a robust and secure execution environment for the multiple programming languages and offers secure, integrated class libraries.

The framework 132 is a multi-tiered architecture that includes an application program interface (API) layer 142, a common language runtime (CLR) layer 144, and an operating system/services layer 146. This layered architecture allows updates and modifications to various layers without impacting other portions of the framework. A common language specification (CLS) 140 allows designers of various languages to write code that is able to access underlying library functionality. The specification 140 functions as a contract between language designers and library designers that can be used to promote language interoperability. By adhering to the CLS, libraries written in one language can be directly accessible to code modules written in other languages to achieve seamless integration between code modules written in one language and code modules written in another language. One exemplary detailed implementation of a CLS is described in an ECMA standard created by participants in ECMA TC39/TG3. The reader is directed to the ECMA web site at www.ecma.ch.

The API layer 142 presents groups of functions that the applications 130 can call to access the resources and services provided by layer 146. By exposing the API functions for a network platform, application developers can create Web applications for distributed computing systems that make full use of the network resources and other Web services, without needing to understand the complex interworkings of how those network resources actually operate or are made available. Moreover, the Web applications can be written in any number of programming languages, and translated into an intermediate language supported by the common language runtime 144 and included as part of the common language specification 140. In this way, the API layer 142 can provide methods for a wide and diverse variety of applications.

Additionally, the framework 132 can be configured to support API calls placed by remote applications executing remotely from the servers 134 that host the framework. Representative applications 148(1) and 148(2) residing on clients 120(3) and 120(M), respectively, can use the API functions by making calls directly, or indirectly, to the API layer 142 over the network 104.

The framework may also be implemented at the clients. Client 120(3) represents the situation where a framework 150 is implemented at the client. This framework may be identical to server-based framework 132, or modified for client purposes. Alternatively, the client-based framework may be condensed in the event that the client is a limited or dedicated function device, such as a cellular phone, personal digital assistant, handheld computer, or other communication/computing device.

Developers' Programming Framework

Figure 2:
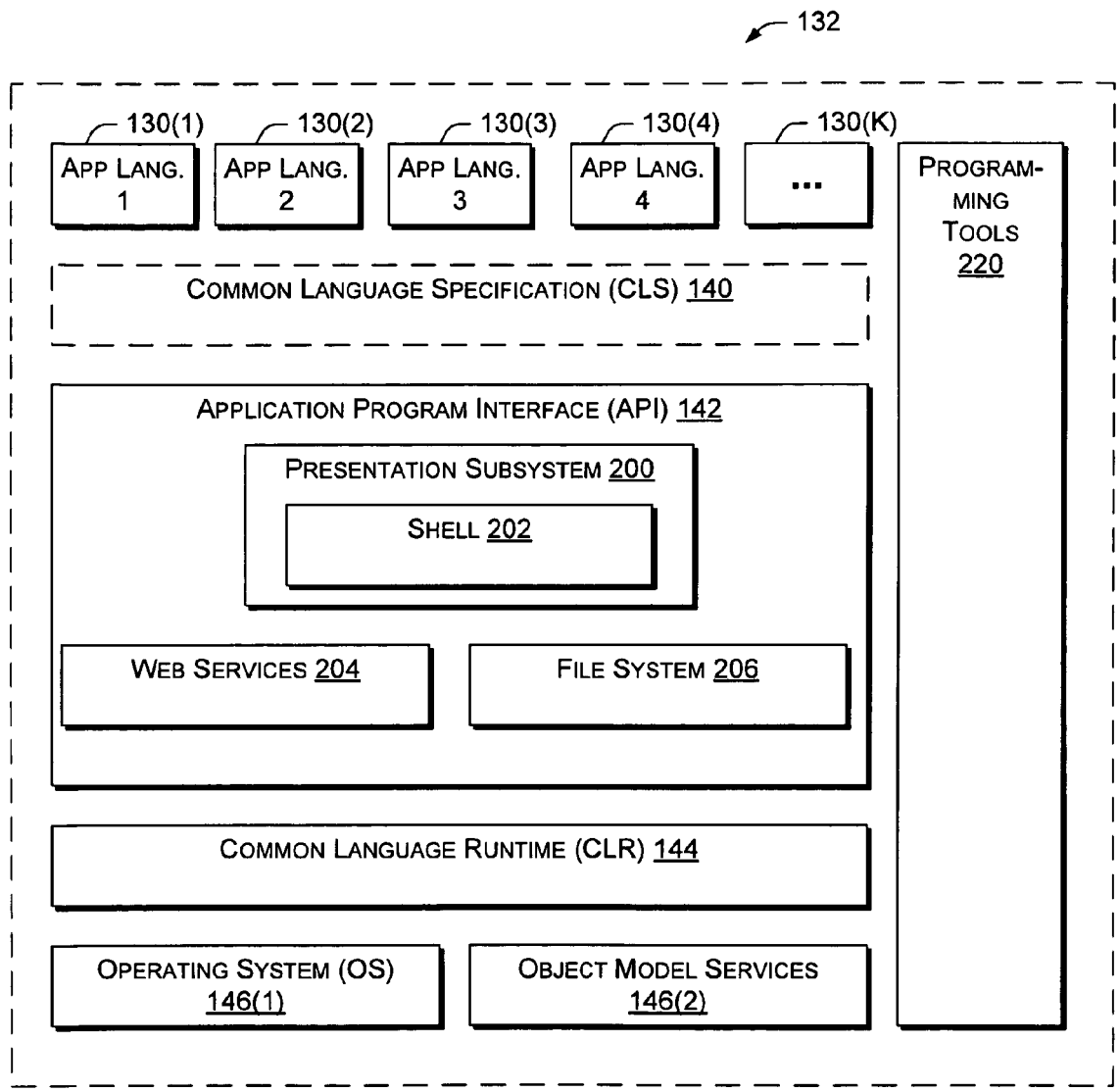
FIG. 2 is a block diagram of a software architecture for a network platform, which includes an application program interface (API).

FIG. 2 shows the programming framework 132 in more detail. The common language specification (CLS) layer 140 supports applications written in a variety of languages 130(1), 130(2), 130(3), 130(4), . . . , 130(K). Such application languages include Visual Basic, C++, C#, COBOL, Jscript, Perl, Eiffel, Python, and so on. The common language specification 140 specifies a subset of features or rules about features that, if followed, allow the various languages to communicate. For example, some languages do not support a given type (e.g., an "int*" type) that might otherwise be supported by the common language runtime 144. In this case, the common language specification 140 does not include the type. On the other hand, types that are supported by all or most languages (e.g., the "int[ ]" type) is included in common language specification 140 so library developers are free to use it and are assured that the languages can handle it. This ability to communicate results in seamless integration between code modules written in one language and code modules written in another language. Since different languages are particularly well suited to particular tasks, the seamless integration between languages allows a developer to select a particular language for a particular code module with the ability to use that code module with modules written in different languages. The common language runtime 144 allow seamless multi-language development, with cross language inheritance, and provide a robust and secure execution environment for the multiple programming languages. For more information on the common language specification 140 and the common language runtime 144, the reader is directed to co-pending applications entitled "Method and System for Compiling Multiple Languages", filed Jun. 21, 2000 (Ser. No. 09/598,105) and "Unified Data Type System and Method" filed Jul. 10, 2000 (Ser. No. 09/613,289), which are incorporated by reference.

The framework 132 encapsulates the operating system 146(1) (e.g., Windows®-brand operating systems) and object model services 146(2) (e.g., Component Object Model (COM) or Distributed COM). The operating system 146(1) provides conventional functions, such as file management, notification, event handling, user interfaces (e.g., windowing, menus, dialogs, etc.), security, authentication, verification, processes and threads, memory management, and so on. The object model services 146(2) provide interfacing with other objects to perform various tasks. Calls made to the API layer 142 are handed to the common language runtime layer 144 for local execution by the operating system 146(1) and/or object model services 146(2).

The API 142 groups API functions into multiple namespaces. Namespaces essentially define a collection of classes, interfaces, delegates, enumerations, and structures, which are collectively called "types", that provide a specific set of related functionality. A class represents managed heap allocated data that has reference assignment semantics. A delegate is an object oriented function pointer. An enumeration is a special kind of value type that represents named constants. A structure represents static allocated data that has value assignment semantics. An interface defines a contract that other types can implement.

By using namespaces, a designer can organize a set of types into a hierarchical namespace. The designer is able to create multiple groups from the set of types, with each group containing at least one type that exposes logically related functionality. In the exemplary implementation, the API 142 is organized to include three root namespaces. It should be noted that although only three root namespaces are illustrated in FIG. 2, additional root namespaces may also be included in API 142. The three root namespaces illustrated in API 142 are: a first namespace 200 for a presentation subsystem (which includes a namespace 202 for a user interface shell), a second namespace 204 for web services, and a third namespace 206 for a file system. Each group can then be assigned a name. For instance, types in the presentation subsystem namespace 200 can be assigned the name "Windows", and types in the file system namespace 206 can be assigned names "Storage". The named groups can be organized under a single "global root" namespace for system level APIs, such as an overall System namespace. By selecting and prefixing a top level identifier, the types in each group can be easily referenced by a hierarchical name that includes the selected top level identifier prefixed to the name of the group containing the type. For instance, types in the file system namespace 206 can be referenced using the hierarchical name "System.Storage". In this way, the individual namespaces 200, 204, and 206 become major branches off of the System namespace and can carry a designation where the individual namespaces are prefixed with a designator, such as a "System." prefix.

The presentation subsystem namespace 200 pertains to programming and content development. It supplies types that allow for the generation of applications, documents, media presentations and other content. For example, presentation subsystem namespace 200 provides a programming model that allows developers to obtain services from the operating system 146(1) and/or object model services 146(2).

The shell namespace 202 pertains to user interface functionality. It supplies types that allow developers to embed user interface functionality in their applications, and further allows developers to extend the user interface functionality.

The web services namespace 204 pertains to an infrastructure for enabling creation of a wide variety of applications, e.g. applications as simple as a chat application that operates between two peers on an intranet, and/or as complex as a scalable Web service for millions of users. The described infrastructure is advantageously highly variable in that one need only use those parts that are appropriate to the complexity of a particular solution. The infrastructure provides a foundation for building message-based applications of various scale and complexity. The infrastructure or framework provides APIs for basic messaging, secure messaging, reliable messaging and transacted messaging. In the embodiment described below, the associated APIs have been factored into a hierarchy of namespaces in a manner that has been carefully crafted to balance utility, usability, extensibility and versionability.

The file system namespace 206 pertains to storage. It supplies types that allow for information storage and retrieval.

In addition to the framework 132, programming tools 210 are provided to assist the developer in building Web services and/or applications. One example of the programming tools 210 is Visual Studio™, a multi-language suite of programming tools offered by Microsoft Corporation.

Root API Namespaces

Figure 3:
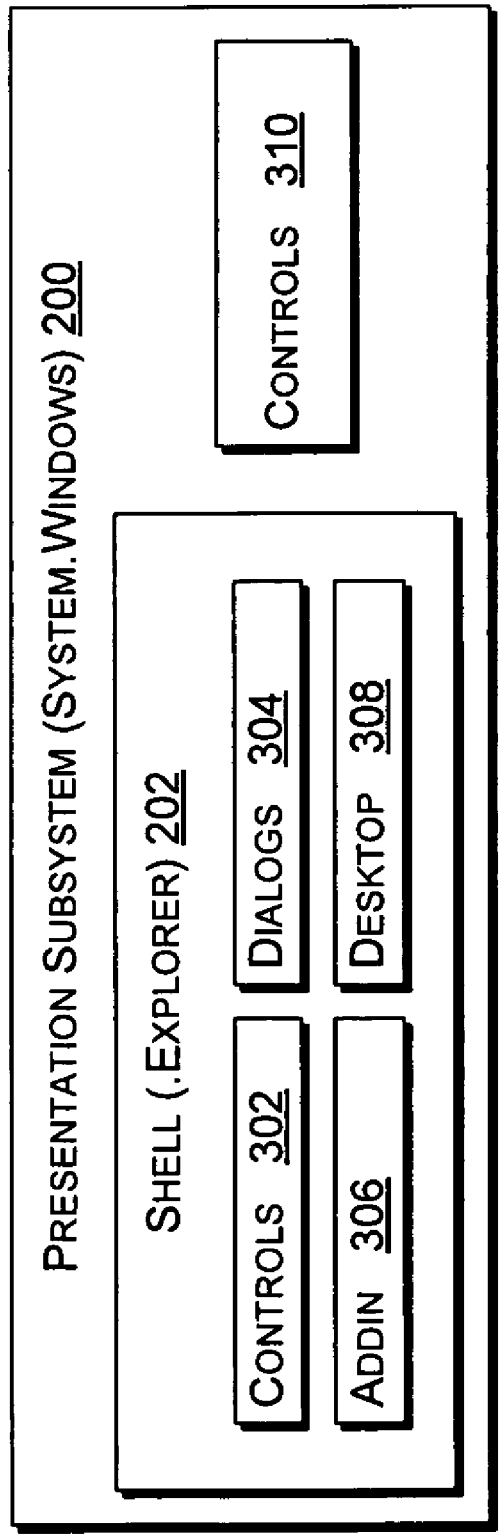
FIG. 3 is a block diagram of unique namespaces supported by the API, as well as function classes of the various API functions.

FIG. 3 shows the presentation subsystem namespace 200 in more detail. In one embodiment, the namespaces are identified according to a hierarchical naming convention in which strings of names are concatenated with periods. For instance, the presentation subsystem namespace 200 is identified by the root name "System.Windows". Within the "System.Windows" namespace is another namespace for the shell, identified as "System.Windows.Explorer", which further identifies another namespace for controls known as "System.Windows.Explorer.Controls". With this naming convention in mind, the following provides a general overview of presentation subsystem namespace 200, although other naming conventions could be used with equal effect.

The Shell namespace 202 ("System.Windows.Explorer"), includes classes and APIs that support user interface functionality to allow end users to explore and navigate to a set of endpoints, such as items in storage systems, files in FTP locations or DAV (Distributed Authoring and Versioning) locations, control panel applets in control panels, applications, and so forth. This navigation can involve opening of one of more folders, as well as opening folders within folders. The Shell namespace 202 allows developers to embed such functionality in their applications, and further allows developers to extend this exploration and navigation functionality. In versions of the Windows® operating system, this user interface is typically referred to as the "Explorer".

In certain embodiments, the storage system that the user interface functionality of shell namespace 202 allows users to explore and navigate through is an active storage platform for organizing, searching for, and sharing all kinds of information. This platform defines a rich data model, builds on top of a relational storage engine, supports a flexible programming model, and provides a set of data services for monitoring, managing, and manipulating data. The data can be file-based or non-file data, and data is typically referred to as an "item". The file system extends the functionality typically provided by file systems because it also deals with items that are non-file data, such as personal contacts, event calendars, and e-mail messages. One example of such a file system is the "WinFS" file system.

A universal data store of the storage system that the user interface functionality of shell namespace 202 allows users to explore and navigate through implements a data model that supports the organization, searching, sharing, synchronization, and security of data that resides in the store. The fundamental unit of storage information in this data store is referred to as an item. The data model provides a mechanism for declaring items and item extensions, for establishing relationships between items, and for organizing items in folders and in categories.

An item is a unit of storable information that, unlike a simple file, is an object having a basic set of properties that are commonly supported across all objects exposed to a user or application program by the storage system. Items also have properties and relationships that are commonly supported across all item types including features that allow new properties and relationships to be introduced. This property and relationship data may also be referred to as metadata associated with an item. As discussed in more detail below, the metadata may be stored in accordance with an item decoration schema. This item decoration schema may indicate an appropriate manner in which to present the item to a user.

Items are the objects for common operations such as copy, delete, move, open, print, backup, restore, replicate, and so forth. Items are the units that can be stored and retrieved, and all forms of storable information manipulated by the storage platform exist as items, properties of items, or relationships between items, each of which is discussed in greater detail herein below. Items are intended to represent real-world and readily-understandable units of data like Contacts, People, Services, Locations, Documents (of all various sorts), and so on.

Items are stand-alone objects; thus, if an item is deleted, all of the properties of the item are also deleted. Similarly, when retrieving an item, what is received is the item and all of its properties contained in the metadata of the item. Certain embodiments may enable one to request a subset of properties when retrieving a specific item; however, the default for many such embodiments is to provide the item with all of its immediate and inherited properties when retrieved. Moreover, the properties of items can also be extended by adding new properties to the existing properties of that item's type. These "extensions" are thereafter bona fide properties of the item and subtypes of that item type may automatically include the extension properties. The extensions may also be referred to as metadata associated with a file.

Groups of items can be organized into special items called item Folders (which are not to be confused with file folders). Unlike in most file systems, however, an item can belong to more than one item Folder, such that when an item is accessed in one item Folder and revised, this revised item can then be accessed directly from another item Folder. In essence, although access to an item may occur from different item Folders, what is actually being accessed is in fact the very same item. However, an item Folder does not necessarily own all of its member items, or may simply co-own items in conjunction with other item Folders, such that the deletion of an item Folder does not necessarily result in the deletion of the item.

Groups of items can also be organized into Categories. Categories are conceptually different from item Folders in that, whereas item Folders may comprise items that are not interrelated (i.e., without a common described characteristic), each item in a Category has a common type, property, or value (a "commonality") that is described for that Category, and it is this commonality that forms the basis for its relationship to and among the other items in the Category. Moreover, whereas an item's membership in a particular Folder is not compulsory based on any particular aspect of that item, for certain embodiments all items having a commonality categorically related to a Category might automatically become a member of the Category at the hardware/software interface system level. Conceptually, Categories can also be thought of as virtual item Folders whose membership is based on the results of a specific query (such as in the context of a database), and items that meet the conditions of this query (defined by the commonalities of the Category) would thus comprise the Category's membership.

In contrast to files, folders, and directories, the items, item Folders, and Categories of the present invention are not characteristically "physical" in nature because they do not have conceptual equivalents of physical containers, and therefore items may exist in more than one such location. The ability for items to exist in more than one item Folder location as well as being organized into Categories provides an enhanced and enriched degree of data manipulation and storage structure capabilities at the hardware/software interface level, beyond that currently available in the art.

Items may also contain relational information which allows relationships between two or more items to be determined. Relationships are binary relationships where one item is designated as source and the other item as target. The source item and the target item are related by the relationship.

Items in the universal data store are presented to a user by a shell browser that provides a user interface (using the classes and APIs of Shell namespace 202) allowing a user to view and to interact with the hardware/software interface. Each item in the universal data store is stored in accordance with a universal data schema. This schema includes a mechanism for describing items called type associations. Each type association has a basic representation in the shell; by storing an item in accordance with a type association, the shell is able to display an item according to at least a basic or default display view.

A type association is a property associated with an item; when placing data into the universal data store one or more properties associated with the data must be declared so as to determine what type of item it is. These properties may be included as metadata associated with the data. The shell has a set of default type associations which represent the most basic and minimal properties which must be declared for an item.

Beyond property declarations, metadata associated with an item may include data indicating how the shell should decorate an item's presentation. Decorations, in this case can be though of as "hints" as to how to represent the item to a user. This metadata may be stored in accordance with an item decoration schema. The item decoration schema defines the item decoration view that the shell may utilize to present the item. For example, the item decoration data may describe the most important declared properties for an item. These "high value" properties may be the most desirable for presentation in the shell.

To present an item, the item decoration data may indicate a set of view fields appropriate for the presentation of the item. View fields are projections of declared properties, and common view fields may include "title," "author," "date of creation" or "last edited." The shell includes a set of standard view fields and independent software venders (ISVs) may define view fields which are appropriate for presentation of their data. When developing new item types, ISVs can either map item properties they define to the shell's view fields or they can provide their own view fields.

For example, particular item data may contain song data. The set of declared properties may include properties such as song title, artist, date recorded, album, song length, and other declarations appropriate for such a song item. The item decoration data may indicate that view fields "Title," "Artist" and "Album" should be displayed to the user when presenting the item in the shell.

Item decorations can be any aspect of the display supported by the shell. Some common other item decorations are, for example, data formatting, default sort order, and default icon size. Additionally, the item decoration data may describe common controls to use in displaying a given item. For example, a Ratings field might use a ratings control that represent the rating as a series of stars. The item decoration data may describe tasks or verbs appropriate for use with an item. The terms "task" and "verb" describe some action to be undertaken with regard to an item and such terms may be used interchangeably. For example, "Edit" or "Preview" may be appropriate tasks/verbs associated with an item. The shell may be furthered configured to launch applications in support of these tasks upon a user selection to perform the action with respect to the item.

An item decoration view is sufficient to fully present a given item or a homogeneous set of items, comprised of items having like item decoration views. To display items with different item decoration schemas, the shell provides shell view schemas that present items according to shell decoration views. A shell view schema allows the shell or ISVs to declare appropriate views for given sets of heterogeneous data.

Items chosen for representation within a shell decoration view may include a common characteristic. A wide variety of common characteristics may be acceptable for a shell decoration view. For example, a shell view schema could define a "Picture" view used to display common and appropriate fields and metadata for all known picture types (e.g., .GIF, .JPEG, .BMP, .TIFF, etc). The shell view schema overrides conflicting display attributes for a given item decoration view and presents each picture item according the shell view schema. As another example, the shell could provide a "Document" shell view that is optimized around appropriate columns and metadata for the items produced by typical productivity applications, such as word processing documents, spreadsheets, or databases, even though the item decorations for each of these items may vary greatly from each other. Such a view has value by providing common properties among each of these documents. When later document types are installed, the shell view will be able to present these new items according to the consistent shell view even though the new type may not have been considered when the view was first created.

The shell view schemas may provide a wide variety of display attributes and ISVs may want to provide such shell views. The display attributes may include, without limitation: the size of the preview pane, metadata to display within the preview pane, custom controls to be used, and tasks and verbs appropriate for the presented items.

The shell can present items according to an explorer display view. An "explorer" may be referred to as a storage application and may be provided by the shell or by ISVs. The explorer, for example, may enable a user to view, query, navigate, launch into tasks, or organize selected items in a data store. The term "explorer" should not imply a location where the displayed items reside, and terms such as "activity center," "viewer" and "library" may be used interchangeably with "explorer" to describe a storage application.

An example explorer schema hierarchy includes a bottom layer which is an item view schema. The item view schema provides the basic display needed to represent an item, and the explorer view schema can defer or fall back upon its display elements when required.

The explorer view schema also includes a shell view schema and explorer decorations. The explorer decorations decorate the explorer as a whole and provide display elements such as distinctive colors and branding elements. These explorer decorations persist among the various views the explorer provides. A wide variety of display attributes may be appropriate for the explorer decorations. For example, data queries or tasks/verbs associated with the explorer items may be appropriate for display with an explorer. Displayed tasks are oftentimes coupled with an application capable of performing the task.

The explorer view schema may optionally include a shell view schema or multiple shell view schemas. The shell view schema may be configured to provide a shell view for a subset of explorer items. For example, an explorer may be configured to display song items to a user. A first shell view schema may be included to provide a display of albums and a second shell view schema may be included to provide a display of song tracks. In this manner, both types of items will have appropriate views within the explorer. As discussed above, the utilization of shell view relates to the presentation of a set of items which, optionally, may share a common characteristic.

The explorer may also rely on shell views included within the shell. If items selected for presentation within an explorer are not supported by any of the shell views included by the explorer, the shell may provide an appropriate shell view for use within the explorer. Similarly and as discussed above, the explorer may also fall back to an item display view or a default display view provided by the shell. This functionality insures that any item which can be displayed by the shell is also capable of display within the explorer. The explorer can be configured to defer to these shell provided display schemas or may rely upon them to, for example, provide a display for unanticipated data.

The Shell namespace 202 supports user interface functionality that allows items to be manipulated and interacted with in a consistent manner regardless of the location where the underlying data for the item (e.g., the file contents, the image data, the contact information data, etc.) is stored. From the point of view of an application designer, the functionality supported by Shell namespace 202 results in a better development experience at least in part because such items can be treated in a consistent manner despite the underlying data being stored in different locations. A coherent experience is provided to the designer when using the Shell namespace 202 despite the potential presence of such different data storage locations.

The Shell namespace 202 defines additional namespaces, including a Controls namespace 302, a Dialogs namespace 304, an Addin namespace 306, and a Desktop namespace 308. Each of these additional namespaces 302, 304, 306, and 308 in the Shell namespace includes one or more services or components that provide various functionality, such as controls, dialogs, and/or handlers, as discussed in more detail below.

The Shell namespace 202 defines an object model that can be used by each of the additional namespaces 302, 304, 306, and 308. This object model includes the following objects:

An ExplorerItem object (also referred to as an Item object) used to describe items that can be presented to the user by way of the Shell, such as a file folders, stacks, individual files, individual WinFS items (e.g., albums, songs, pictures, etc.), and so forth.

A Libraries object used to describe a query against ExplorerItems.

A ViewFields object (also referred to as a Properties object) used to project data from items (e.g., as represented by ExplorerItem objects) for display to the user. A projection defined between properties in the storage system and a ViewFields object can perform additional calculations or processing based on the ExplorerItems. For example, if a folder representing a storage device is being displayed and the designer wishes to include in that folder an amount of free space on that storage device, then the projection calculates the amount of free space based on the total capacity of the storage device and the sizes of the files (represented as ExplorerItems) stored on the storage device A StorageFavorites object used to describe a link to a dynamic list, which is a persistent form of a Library object. The StorageFavorites object is a combination of a query and a view for presenting the results of the query to the user.

This object model is discussed in further detail in U.S. patent application Ser. No. 10/691,885, filed Oct. 23, 2003, entitled "System and method for presenting items to a user with a contextual presentation", issued as U.S. Pat. No. 7,908,562, which is hereby incorporated by reference.

Controls namespace 302 ("System.Windows.Explorer.Controls") defines a collection of re-usable user interface controls that can be used by applications. As multiple different applications can make use of these controls, these controls can be viewed as being re-usable. This collection of re-usable controls can simplify design of the application because the application designers can rely on these controls rather than being required to design their own versions of the controls. Additionally, by using this collection of re-usable controls, a consistent look and feel across multiple applications can be achieved.

The controls defined by Controls namespace 302 allow manipulation and/or display of shells of the user interface, including manipulation and/or display of items in the user interface. As discussed above, these items that can be displayed within shells of the user interface represent any of a wide variety of kinds of data and are not simply traditional "files" stored in a file system. Furthermore, the controls defined by Controls namespace 302 allow application designers to use the same controls when working with data from a wide variety of locations, resulting in a consistent and coherent design experience.

The Controls namespace 302 defines the following reusable controls:

An ExplorerView control is used to encapsulate the storage user experience. The storage user experience is defined to work across items with relationships, queries, and so forth. This storage user experience allows end users to, for example, issue queries based on property values, stack WinFS items with common property values, allow drag and drop from non-stacked items to stacks (e.g. by setting the value of a property in the property predicate to what exists in the stack), and so forth. The ExplorerView control can also be used to describe a folder for display having the same appearance as can be found in previous operating systems (also referred to as legacy systems), such as previous versions of the Microsoft® Windows® operating system (e.g., the Windows® XP or Windows® 98 versions of the Windows® operating system).

An ExplorerItemView control used to display ExplorerItems. The layout and design of the ExplorerItems can be defined by the application designer. The operating system may also define a user experience that imposes some constraints on the layout and design that can be defined by the application designer, so the layout and design defined by the application designer is consistent with the user experience defined by the operating system. Thus, the ExplorerItemView control allows the designer to determine how the data from the ExplorerItems is to be displayed to the user (e.g., in columns, rows, or some other configuration) as well as what data is to be displayed to the user.

A BasketControl control used to allow items to be added to a sidebar (sidebars are discussed in additional detail below). An item can be added to the sidebar in a "drag and drop" manner by using a cursor control device to select an item and drag it over the sidebar, where it can be dropped (e.g., by releasing a cursor control button). The BasketControl control is discussed in further detail in U.S. patent application Ser. No. 10/684,263, filed Oct. 13, 2003, entitled "Extensible Creation And Editing Of Integrated Collections", which is hereby incorporated by reference.

A ListMaker control used to allow items to be added to a list or group. Lists or groups of items can be created in a "drag and drop" manner by using a cursor control device to select an item and drag it over the appropriate list or group, where it can be dropped (e.g., by releasing a cursor control button). For example the items may be songs and the list a playlist, the items may be images and the list a photo album, and so forth.

A PreviewImageControl component used to allow preview images of items to be presented to the user. When an item is selected, the preview image can be presented to the user, the preview image typically being larger than a thumbnail for the image but less than the entire display area of the user interface.

Dialogs namespace 304 ("System.Windows.Explorer.Dialogs") defines a collection of user interface dialogs and wizards that can be used by applications. Similar to the controls in the Controls namespace 302, the dialogs and wizards in the Dialogs namespace 304 can be re-used so that multiple different applications can make use of these dialogs and wizards. This collection of re-usable dialogs and wizards helps maintain a consistent look and feel across multiple applications.

The dialogs and wizards defined by Dialogs namespace 304 allow actions to be performed within a shell of the user interface. As discussed above, these shells can be based on items that can represent any of a wide variety of kinds of data and are not simply traditional "files" stored in a file system. Furthermore, the dialogs and wizards defined by Dialogs namespace 304 allow application designers to use the same dialogs and wizards when working with data from a wide variety of locations, resulting in a consistent and coherent design experience.

The Dialogs namespace 304 defines the following dialogs and wizards:

Open/Save dialogs used to allow files and folders to be opened and saved. These dialogs are also extensible, allowing application designers to extend the functionality of the dialogs. For example, these dialogs can be extended to make use of various additional meta data regarding the files and/or folders that the application designer desires to use.

CD/DVD Burn wizards used to allow optical discs, such as CDs and/or DVDs, to be written to. Hardware designers can provide their own wizards including their own hardware-specific steps that allow CDs and/or DVDs to be written to.

Send Photos wizard used to assist users in sending images by electronic mail. The wizard allows the user to re-size the image to a particular size. The wizard may re-size the image to a particular size deemed suitable for electronic mailing, or alternatively may allow the user to select from two or more different sizes.

Addin namespace 306 ("System.Windows.Explorer.Addin") defines a collection of base classes and interfaces for extending the user interface functionality. Adding namespace 306 allows application designers to add managed code that extends the functionality of the user interface. This extension allows, for example, the application designers to customize portions of the user interface as they see fit.

The Addin namespace 306 allows for the extension of shells of the user interface that are used to display items, which represent any of a wide variety of kinds of data and are not simply traditional "files" stored in a file system. Furthermore, the Addin namespace 306 allows application designers to extend the shells of the user interface in a coherent manner, providing a more managed and improved design experience.

Managed code for various functionality is supported by the Addin namespace 306, such as:

Context menu handlers. Context menus can be accessed, for example, by right-clicking on an item being displayed. The context menu handlers allow application designers to define their own entries to be added to these context menus.

Thumbnail extractors. Thumbnail extractors allow application designers to develop their own thumbnails (e.g., for files, folders, and/or other items being displayed) and identify those thumbnails to the operating system for display to the user.

Handlers for composing/decomposing projections from WinFS to Explorer. These handlers allow application designers to perform various calculations when displaying information regarding files and/or folders to the user (e.g., allowing the amount of free space on a storage device to be calculated).

Desktop namespace 308 ("System.Windows.Explorer.Desktop") defines a collection of functionality that allows application designers to extend the functionality of the desktop displayed to users. The Desktop namespace may be part of the Shell namespace 202 (e.g., "System.Windows.Explorer.Desktop"), or alternatively may be part of the presentation subsystem namespace 200 but not part of the Shell namespace 202 (e.g., "System.Windows.Desktop"). The Desktop namespace includes elements involved in the sidebar and notifications. Including the sidebar and notifications elements in the Desktop namespace provides the user with a centralized control for the sidebar and notifications. For example, rules regarding notifications from all applications can be set by the user once, rather than requiring the user to navigate through accessing rule definitions for each application that uses notifications.

In general, the sidebar provides dynamic communication access and information awareness in an integrated interactive peripheral awareness display within which specified communications contacts and informational elements are dynamically tracked or received and provided to a user on an ongoing basis. In certain embodiments, this capability is provided via at least one customizable dynamic thumbnail displayed in one or more columns in a persistent display strip along one edge of a conventional display device. Further, in additional embodiments, the thumbnails are displayed on any one portion or portions of a display, including the entire display. The embodiment wherein the entire display is covered is particularly useful where the sidebar will be used on a device having a relatively small display area, such as, for example, a handheld or palm top computing device, a cell phone, or any other electronic device having a limited display area.

Each of the customizable dynamic thumbnails represents, for example, particular communications contacts (such as, particular individuals, businesses, organizations, or other entities) or particular elements of information that a user may be interested in. Such information elements include, for example, when shared files or folders are modified, when information in a shared database or workspace changes, email status, calendars, Internet web pages, weather conditions, appointments, schedules, statistical information, stock quotes, traffic information, or any other Internet or network accessible information that may be of interest to a user.

The aforementioned dynamic thumbnails generally comprise a combination of a "tile" (also referred to as a "ticket") describing the contact or information of interest and a specialized "viewer" for displaying whatever communications contact or information is represented by the tile. Each tile and viewer can, for example, be an item in the storage system that can be accessed by way of the user interface functionality provided by shell namespace 202. The one or more "services" are used to automatically interact with, track, or receive the current state of the information and/or status of the communications contacts described by each tile. The current state of the information and the status of the communications contacts are then dynamically provided by hosting each tile in a "container" residing within an interactive peripheral awareness interface for graphically and/or textually displaying the items. The peripheral awareness interface displays information and/or communications contacts in such a way as to reduce any potential distraction or interruption to the user.

In general, a tile is represented by a data structure such as an XML data file. Each tile includes instructions as to what information or communications contact is to be represented by the tile as well as pointers to particular services that represent any of a number of conventional means for accessing and/or interacting with the information or communications contacts. These services are automatically or manually selected from a predefined or user definable library of services. In particular, the different services represent shared code or functions that provide functionality for accessing, receiving, retrieving, and/or otherwise interacting with any conventional information, source of information, or communications contact. These services are shared in the sense that they are used either alone, or in combination, and may be used simultaneously by one or more tiles. Consequently, it should be noted that in certain embodiments multiple services are used in combination for providing complex interactions with any conventional information, source of information, or communications contact.

One example of a service is the functionality necessary for monitoring an email folder by connecting to a conventional MAPI server. Another example of a service is functionality for sending or receiving email messages. Related services provide functionality for communicating with contacts or transferring information via any number of conventional methods, such as, for example instant messaging or peer-to-peer communications schemes. Another example of a service is functionality to convert a text file from one language to another. A further example of a service is functionality necessary for monitoring a database. Still other examples of services include functionality for receiving or retrieving data from a web site or a remote server. Clearly, any method for interacting with any information, source of information, or communications contact can be implemented as a shared service for use by one or more tiles.

Further, as noted above, each tile's instructions includes a pointer to one of a number of specialized viewers having the capability to display whatever type of information or communications contact is represented by the tile. In other words, each tile represents a combination of the information or contact that a user desires to keep track of along with a definition of how the user desires to view that particular information or contact as well as the ability to use any of a number of services for accessing and interacting with the information or contact. Such access or interaction can be accomplished locally, or across local intranets, extranets, wired or wireless networks, the Internet, etc. via any conventional communications protocol.

The viewers graphically display the tile as a resizable thumbnail or icon-sized window having the information or contact data retrieved via one or more of the services. In particular, the viewer is capable of dynamically displaying a tile having textual, audible, or graphical information, including still or live images, or any combination of textual, audible, or graphical information. For example, one viewer type is capable of displaying contact information, i.e. a "person tile", another is capable of displaying specific email information, such as, for example, number of messages received, or number of messages from a particular source, another viewer is designed to interact with a database to provide a summary of particular information from the database in the thumbnail. Further examples of viewer types include viewers capable of displaying still images, video images, a summary of communications status, the results of a database query, etc. Clearly, any type of viewer can designed to be associated with any corresponding type of information to ensure that any possible information can be displayed.

The sidebar is discussed in further detail in U.S. patent application Ser. No. 10/063,296, entitled "A system and process for providing dynamic communication access and information awareness", which is hereby incorporated by reference.

The sidebar functionality of namespace 308 allows application designers to add tiles to the sidebar.

Notifications (e.g., audible or visual notifications) are part of a user context system that, in accordance with certain embodiments, includes three elements that are compared for a decision as to how to process a notification. The first element is the user's context (as may be provided by the operating system and arbitrary programs that have extended it). The second element is the user's rules and preferences. The third element is the notification itself (which contains elements such as data and properties that may match the user's rules).

The user context system operates by the operating system and other programs declaring a user's contexts, after which the system brokers the user's context and rules. Notifications are raised by other programs calling into the system. The user's context, rules, and elements of the notification are compared and then a determination is made as to what should be done with the notification. Examples of various options for what may be done with the notification include denying (e.g., if the notification is not allowed to draw or make noise, and the notification is to never be seen by the user), deferring (e.g., the notification is held until the user's context changes or the user's rules dictate that it is subsequently appropriate to deliver), delivering (e.g., the notification is allowed to be delivered in accordance with the user's context and rules), and routing (e.g., the user's rules indicate that the notification should be handed off to another system, regardless of whether the notification is also allowed to be delivered in the present system).

In general, the user may be in a state deemed "unavailable" in which case the notification is either not delivered or held until the user becomes "available". For instance, if the user is running a full screen application, that user may be deemed unavailable. Or, the user may be "available" but in such a state that the notification needs to be modified to be appropriate for the user. For instance, if the user is listening to music or in a meeting, the user may have indicated that the notifications should be delivered to the user's screen but that the sound they make should be either quieter or not made at all.

As noted above, the user context can determine in part whether notifications are shown on the user's screen. When a notification is shown, it may be shown based on certain gradients within the user context. In other words, there are different levels of invasiveness of the form of the drawn notification that may be specified. For example, a normal notification is free to pop out into the client area and briefly obscure a window. If the user is in a slightly restrictive context, the notification may be free to show, but only in a less invasive manner, such as it might not be allowed to draw on top of another window. As another example, in one embodiment where the user is running a maximized application, the default setting may be that this means that context is slightly restricted, and that the user has clearly made a statement that they want this application to get the entire client area. In this setting, a notification may still be allowed to draw, but may be made to only appear within the sidebar. In other words, this type of reduced invasiveness in the notification drawing form lessens the impact of the notification, and overall lessens the cognitive load.

User context systems are discussed in further detail in U.S. patent application Ser. No. 10/402,179, filed Mar. 26, 2003, entitled "System and Method Utilizing Test Notifications", which is hereby incorporated by reference.

The notifications functionality of namespace 308 allows application designers to create their own notifications and have them displayed on the desktop to notify the user when something that may be of interest to the user has happened (e.g., an email message has been received, an instant message has been received, and so forth). The notification functionality of namespace 308 further provides a central location for users to define their rules and preferences for notifications from multiple applications, releasing users from the burden of setting the same rules and preferences multiple times (once for each of the multiple applications).

Additionally, a Contacts namespace defines a collection of controls and dialogs for contact information. This contact information can be stored as items in the storage system. A "contact" generally refers to any person, group, organization, business, household, or other type of identifiable entity. "Contact information" generally refers to any information that corresponds to a contact and that may be considered relevant for identifying, contacting, accessing, corresponding or communicating with the contact. Contact information is used by an application to perform a desired function, such as, for example, sending an email, initiating a telephone call, accessing a website, initiating a gaming session, performing a financial transaction, and so forth. Non-limiting examples of contact information include names, aliases, telephone numbers, email addresses, home addresses, instant messaging (IM) addresses, and web addresses. Contact information can also refer to other types of information such as the status of a contact. For example, information indicating a contact is currently online, or on a telephone line may also be broadly considered as contact information.

The Contacts namespace can be part of the presentation subsystem namespace 200 but not part of the Shell namespace 202, such as, "System.Windows.Contacts", "System.Windows.Controls" (controls 310 of FIG. 3), or "System.Windows.Collaboration". Alternatively, the Contacts namespace could be part of the Shell namespace 202. The Contacts namespace expands the functionality of the System.Windows namespace, but need not be implemented as part of the Shell (that is, need not be part of the System.Windows.Explorer namespace 302).

The Contacts namespace allows contact information to be entered once by the user yet be accessed by multiple different applications. The user is thus released from the burden of entering the same contact information multiple times (once for each of the multiple applications).

The controls and dialogs in the Contacts namespace include:

A Contact Picker dialog used to allow users to select or pick a contact from their stored contacts. For example, allows users to select a contact to which an electronic mail message will be sent, or a contact for Instant Messaging. The user can browse through a list, for example, of all of the user's contacts stored as items in the storage system and select one or more of those contacts. The Contact Picker dialog is discussed in further detail in U.S. patent application Ser. No. 10/324,746, filed Dec. 19, 2002, entitled "Contact Picker", which is hereby incorporated by reference.

A Contact Textbox control used to allow users to enter contact information such as a name in freeform (e.g., by typing the name in) and, as the contact information is entered, the control resolves the information to one or more contacts from the user's stored contacts. The resolved information can be displayed, for example, in a drop-down menu or may be automatically entered into a type-in line where the user was entering the name in freeform.

A Contact control used to display contact information to users. Editing or freeform entry of contact information is not supported by this control.

Example Namespace Members

This section includes multiple tables describing the examples of members that may be exposed by example namespaces (e.g., namespaces in presentation subsystem namespace 200 of FIG. 3). These exposed members can include, for example, classes, interfaces, enumerations, and delegates. It is to be appreciated that the members described in these examples are only examples, and that alternatively other members may be exposed by the namespaces.

It should be appreciated that in some of namespace descriptions below, descriptions of certain classes, interfaces, enumerations and delegates are left blank. More complete descriptions of these classes, interfaces, enumerations and delegates can be found in the subject matter of the compact discs that store the SDK referenced above.

System.Windows.Explorer.Controls

The following tables list examples of members exposed by the System.Windows.Explorer.Controls namespace.

Classes

| | |
|---|---|
| DefaultCommandEventArgs | Contains event data for the DefaultCommandEvent event. |
| ExplorerView | Allows a user to view information about a folder's contents. |
| FolderSelectionChangedEventArgs | Contains event data for the FolderSelectionChangedEvent event. |
| IncludeItemEventArgs | Contains event data for the IncludeItemEvent event. |
| ItemVerbModifyEventArgs | Initializes a new instance of the ItemVerbModifyEventArgs class. |
| NavigationCompleteEventArgs | Contains event data for the NavigationCompleteEvent event. |
| NavigationFailedEventArgs | Contains event data for the NavigationFailedEvent event. |
| NavigationPendingEventArgs | Contains event data for the NavigationPendingEvent event. |

Enumerations

FolderViewFlags Indicates the view properties for the ExplorerView.

FolderViewMode Indicates the view mode for the ExplorerView.

Delegates

| | |
|---|---|
| DefaultCommandEventHandler | Represents a method that will handle the DefaultCommandEvent. |
| FolderSelectionChangedEventHandler | Represents a method that will handle the FolderSelectionChangedEvent. |
| IncludeItemEventHandler | Represents a method that will handle the IncludeItemEvent. |
| ItemVerbModifyEventHandler | Represents a method that will handle the ItemVerbModifyEvent. |
| NavigationCompleteEventHandle | Represents a method that will handle the NavigationCompleteEvent. |
| NavigationFailedEventHandler | Represents a method that will handle the NavigationFailedEvent. |
| NavigationPendingEventHandler | Represents a method that will handle the NavigationPendingEvent. |

System.Windows.Explorer.Dialogs

The following tables list examples of members exposed by the System.Windows.Explorer.Dialogs namespace.

Classes

| | |
|---|---|
| ColorDialog | |
| CommonDialog | |
| DialogControlItemSelectedEventArgs | |
| FileDialog | An abstract class that is used as the parent class of OpenFileDialog and SaveFileDialogBase. |
| FileDialogCheckButton | Represents a check box control that can be placed on a FileDialog. |
| FileDialogComboBox | |
| FileDialogContainerControlBase | An abstract class that is used as the parent class of FileDialogComboBox, FileDialogOpenDropDown, FileDialogRadioButtonGroup, and FileDialogToolbarMenu. |
| FileDialogControlBase | An abstract class that is used as the parent class of FileDialogCheckButton, FileDialogEditBox, FileDialogPushButton, and FileDialogContainerControlBase. |
| FileDialogControlItem | |
| FileDialogEditBox | Represents a text box control that can be placed on a FileDialog. |
| FileDialogOpenDropDown | |
| FileDialogPushButton | Represents a button control that can be placed on a FileDialog. |
| FileDialogRadioButtonGroup | |
| FileDialogToolbarMenu | |
| FileOkEventArgs | |
| FileType | |
| OpenFileDialog | Allows a user to select one or more file to open. This class cannot be inherited. |
| SaveAsFileDialog | Enables a user to choose a location at which to save a file, and to specify a filename. This class cannot be inherited. |
| SaveFileDialog | Allows a user to choose a location at which to save a file. This class cannot be inherited. |
| SaveFileDialogBase | An abstract class that is used as the parent class of SaveAsFileDialog and SaveFileDialog. |

Enumerations

| |
|---|
| FileDialogLayout |
| TileAttributes |

Delegates

| |
|---|
| DialogControlItemSelectedEventHandler |
| FileOkEventHandler |

System.Windows.Desktop

The following tables list examples of members exposed by the System.Windows.Desktop namespace. This namespace contains elements involved in the sidebar and notifications.

Classes

| | |
|---|---|
| AnalogClockPanel | |
| Appbar | |
| AreaButton | |
| BaseComTile | |
| BaseSidebarClockSettings | |
| BaseTile | An abstract class used as the parent class of a custom sidebar tile implementation. |
| BasketControl | |
| CalendarElement | |
| CalendarImages | |
| ChildrenWontFitArgs | |
| ClockHacks | |
| ClockPanel | |
| DataSourceEventArgs | Represents event data passed from a data source. |
| DigitalDateTimeElement | |
| DragButton | |
| DragControlWindow | |
| DraggableButton | |
| DragWindow | |
| DropArgs | |
| DropEventArgs | |
| ExtraSpaceArgs | |
| FillAlphaPresenter | |
| FillImageResourcePresenter | |
| FillPanel | |
| FillPresenter | |
| Flyout | |
| FlyoutLinkClickEventArgs | Represents event data passed to an RMAActionEventHandler in response to an event that originated from the optional link found at the bottom of a sidebar tile's flyout view. |
| FlyoutPresenter | |
| FlyoutStuff | |
| FocusableButton | |
| FocusWithinWorkaroundHelper | |
| FolderContentsChangedEventArgs | Represents event data passed to a FolderContentsChangedEventHandler in response to a change in the folder's contents. |
| GlobalSetting | |
| HackBorder | |
| HackImage | |
| ImageButton | |
| ImageResource | |
| ImageResourcePresenter | |
| ItemControl | |
| ItemToolbarControl | |
| ListMakerControl | |
| MenuStuff | |
| NativeResource | |
| NativeResourceHelper | |
| NativeResources | |
| NativeResourceTypeConverter | |
| NormalButton | |
| Notification | Represents a message and its associated data that the system sends to the user in a piece of user interface (UI). |
| NotificationArea | |
| NotificationButton | Defines a button that appears on a notification. |
| NotificationClickedEventArgs | Contains data associated with a click event in a notification window. |
| NotificationContext | Declares whether an application is currently in a particular state. This state is used as part of the definition of the user's context. |
| NotificationTimerPresenter | |
| NotifyCompleteEventArgs | |
| NotifyWindow | |
| OptionsButton | |
| OuterTile | |
| OverflowableCollection | |
| OverflowableControlCollection | |
| OverflowPanel | |
| OverflowPresenter | |
| OverFlowWrapper | |
| PanelInfo | |
| ProgressBar | |
| QuickLaunchTile | |
| RMAActionEventArgs | Represents event data generated by a Rich Minimized Application (RMA). Consumed by an RMAActionEventHandler. |
| RMAData | |
| SetDataArrayEventArgs | Represents event data generated by a data array and sent to a SetDataArrayEventHandler. |
| Sidebar | |
| SidebarAlarmClock | |
| SideBarClock | |
| SidebarClockSettings | |
| SlideShowTile | |
| StackAlphaPresenter | |
| StackImageResourcePresenter | |
| StartButton | |
| SyncHelper | |
| SyncItemBar | |
| SyncTile | |
| Taskbar | |
| TaskChevron | |
| TaskGroup | |
| TaskItem | |
| TaskList | |
| TaskOverflow | |
| TaskOverflowable-ControlCollection | |
| TaskPresenter | |
| TestTile | |
| TestTimeZone | |
| TextElementFontInfo | |
| Theme | |
| ThemeHelper | |
| ThemeHelperOld | |
| ThemeImage | |
| ThemeImageTypeConverter | |
| ThemeResources | |
| Tile | |
| TileCollection | |
| TileOverflow | |
| TileThumb | |
| TileThumbDotNet | |
| Timer | |
| TimerStuff | |
| TimeZone | |
| ViewStatusControl | |
| WebHostEventArgs | |
| WindowOrigin | |
| WindowOriginOld | |
| WindowStuff | |

Interfaces

| | |
|---|---|
| ICOMDataSourceHandler | Used to create and communicate with a data source implemented in unmanaged code. |
| IOverflow | |
| IOverflowList | |
| ISidebar | Provides access to the sidebar, which hosts individual tiles. The sidebar host is reponsible for opening and closing flyouts, displaying shortcut menus, and responding to events that involve the individual tiles. |
| ISidebarAlarm | |

Enumerations

| | |
|---|---|
| AlarmState | |
| BasketFlags | |
| DragWindowPos | |
| InvokeFolderActionEnum | Enumeration for deciding what to do when a user invokes an ItemControl for a folder. Used with InvokeFolderAction and ItemControlInvokeFolderAction. |
| RMAAction | Constants used with the Action property to define an event action. |
| SelectionModeEnum | |

Delegates

| | |
|---|---|
| ChildrenWontFitHandler | |
| DocumentCompleteEventHandler | |
| DropEventHandler | |
| DropHandler | |
| DummyDelegateToSetupAppDomainProperly | |
| ExtraSpaceHandler | |
| FlyoutClosingEventHandler | |
| FlyoutLinkClickEventHandler | Represents the method that handles FlyoutLinkClickEvent events. |
| FolderContentsChangedEventHandler | |
| NavigateErrorEventHandler | |
| NotificationClickedEventHandler | Represents the method that handles NotificationClickedEvent events. |
| NotifyCompleteEventHandler | Represents the method that handles NotifyCompleteEvent events. |
| RMAActionEventHandler | Represents the method that handles RMAActionEvent events. |
| SetDataArrayEventHandler | Represents the method that handles SetDataArrayEvent events. |

System.Windows.Controls

Provides classes and interfaces used by shell components.

The following tables list examples of members exposed by the System.Windows.Controls namespace.

Classes

| |
|---|
| ContactControl |
| ContactPickerDialog |
| ContactPropertyRequest |
| ContactPropertyRequestCollection |
| ContactSelection |
| ContactSelectionCollection |
| ContactTextBox |
| ContactTextBoxSelectionChangedEventArgs |
| ContactTextBoxTextChangedEventArgs |
| ContactTextBoxTextResolvedEventArgs |
| IncludeContactEventArgs |
| IteratedEventArgs |
| Iterator |
| OKCancelApplyEventArgs |
| OKCancelApplyStrip |

Enumerations

| |
|---|
| ContactControlPropertyPosition |
| ContactPickerDialogLayout |
| ContactPropertyCategory |
| ContactPropertyType |
| ContactType |
| OKCancelApplyType |

Delegates

| |
|---|
| ContactTextBoxSelectionChangedEventHandler |
| ContactTextBoxTextChangedEventHandler |
| ContactTextBoxTextResolvedEventHandler |
| IncludeContactEventHandler |
| IteratedEventHandler |
| OKCancelApplyEventHandler |
| OpenedEventHandler |

Exemplary Computing System and Environment

Figure 4:
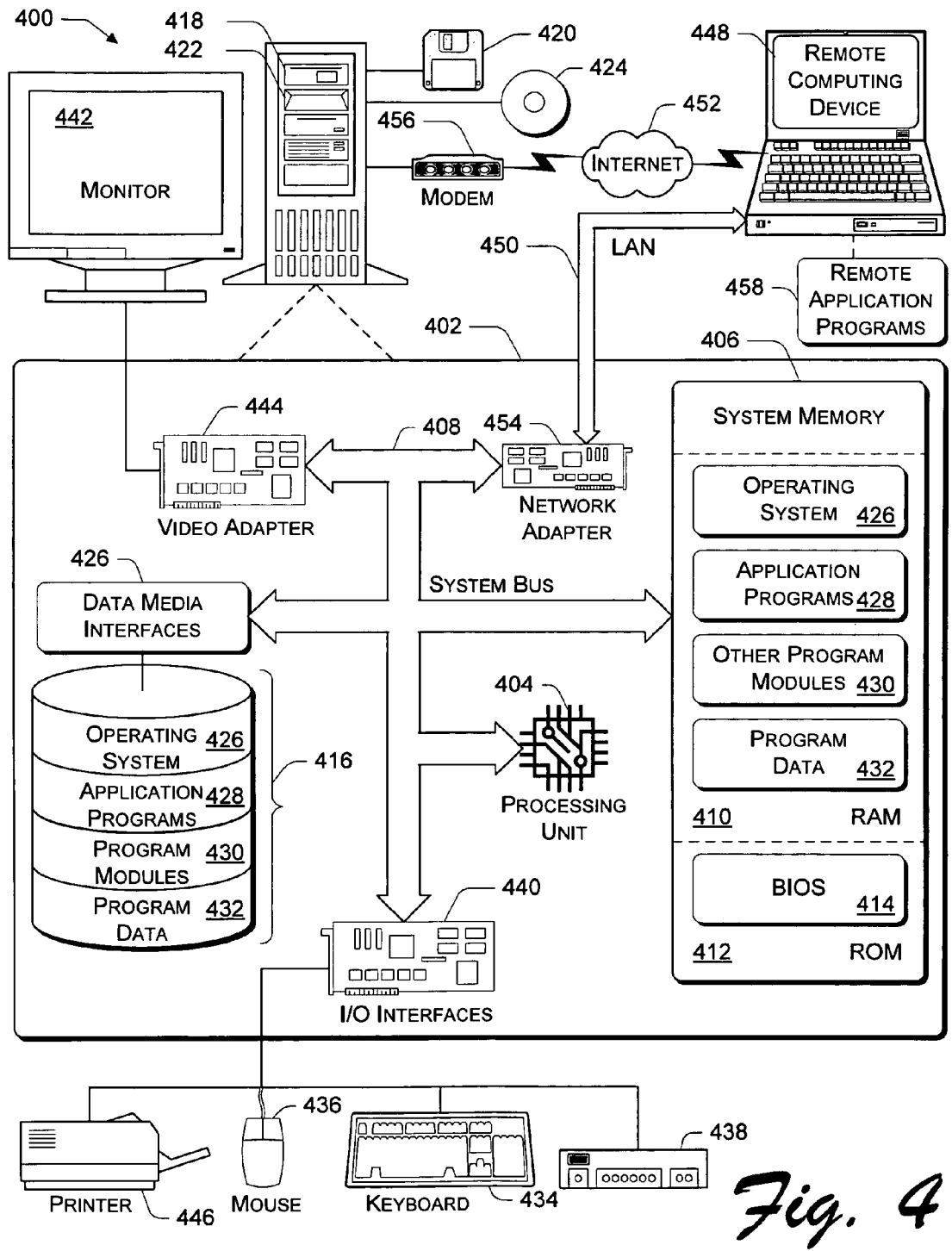
FIG. 4 is a block diagram of an exemplary computer that may execute all or part of the software architecture.

FIG. 4 illustrates an example of a suitable computing environment 400 within which the programming framework 132 may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The framework 132 may be implemented with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as cellular phones, personal digital assistants, handheld computers, or other communication/computing devices.

The framework 132 may be described in the general context of computer-executable instructions, such as program modules, being executed by one or more computers or other devices. Generally, program modules include routines, programs, objects, components, data structures, etc. that perform particular tasks or implement particular abstract data types. The framework 132 may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing device in the form of a computer 402. The components of computer 402 can include, by are not limited to, one or more processors or processing units 404, a system memory 406, and a system bus 408 that couples various system components including the processor 404 to the system memory 406.

The system bus 408 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of the operating system 426, one or more application programs 428, other program modules 430, and program data 432 (or some combination thereof) may include elements of the programming framework 132.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and so on. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

An implementation of the framework 132, and particularly, the API 142 or calls made to the API 142, may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 5:
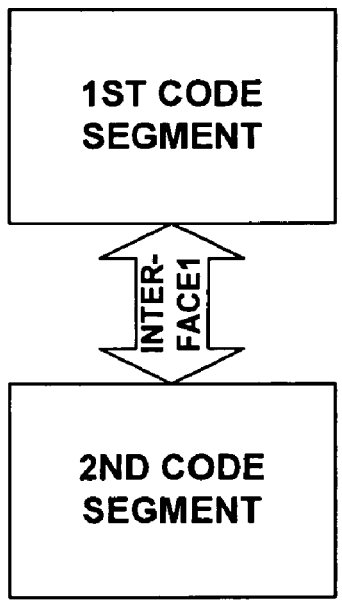
FIGS. 5, 6, 7, 8, 9, 10, 11, 12, 13, 14, 15, and 16 illustrate various example implementations of a programming interface.
Figure 6:
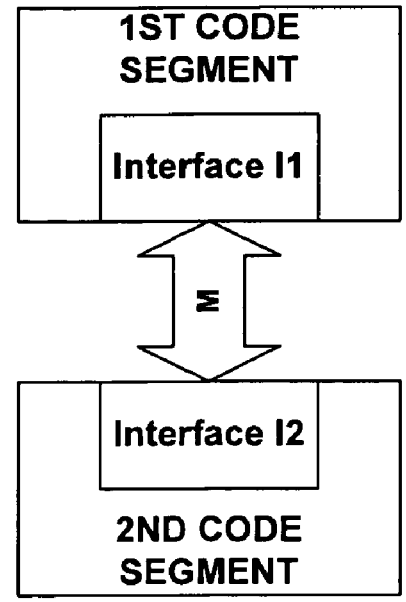

Notionally, a programming interface may be viewed generically, as shown in FIG. 5 or FIG. 6. FIG. 5 illustrates an interface Interface1 as a conduit through which first and second code segments communicate. FIG. 6 illustrates an interface as comprising interface objects I1 and I2 (which may or may not be part of the first and second code segments), which enable first and second code segments of a system to communicate via medium M. In the view of FIG. 6, one may consider interface objects I1 and I2 as separate interfaces of the same system and one may also consider that objects I1 and I2 plus medium M comprise the interface. Although FIGS. 5 and 6 show bi-directional flow and interfaces on each side of the flow, certain implementations may only have information flow in one direction (or no information flow as described below) or may only have an interface object on one side. By way of example, and not limitation, terms such as application programming or program interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 5 and 6, but they nonetheless perform a similar function to accomplish the same overall result. We will now briefly describe some illustrative alternative implementations of a programming interface.

A. Factoring

Figure 7:
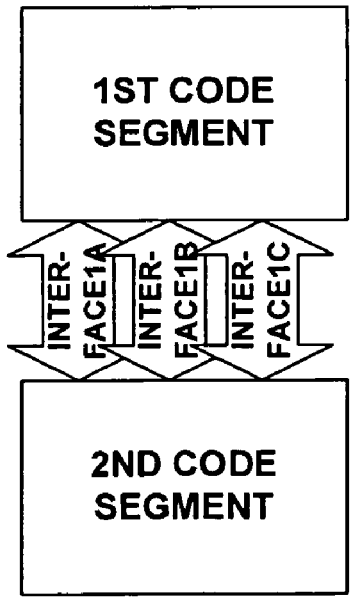
Figure 8:
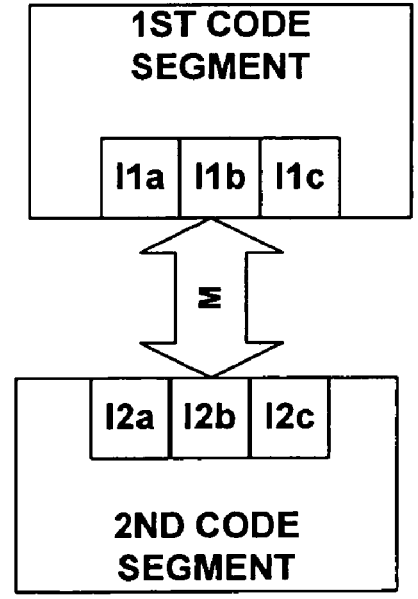

A communication from one code segment to another may be accomplished indirectly by breaking the communication into multiple discrete communications. This is depicted schematically in FIGS. 7 and 8. As shown, some interfaces can be described in terms of divisible sets of functionality. Thus, the interface functionality of FIGS. 5 and 6 may be factored to achieve the same result, just as one may mathematically provide 24, or 2 times 2 times 3 times 2. Accordingly, as illustrated in FIG. 7, the function provided by interface Interface1 may be subdivided to convert the communications of the interface into multiple interfaces Interface1A, Interface 1B, Interface 1C, etc. while achieving the same result. As illustrated in FIG. 8, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the $1^{st}$ code segment need not match the number of interfaces included with the $2^{nd}$ code segment. In either of the cases of FIGS. 7 and 8, the functional spirit of interfaces Interface1 and I1 remain the same as with FIGS. 5 and 6, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 9:
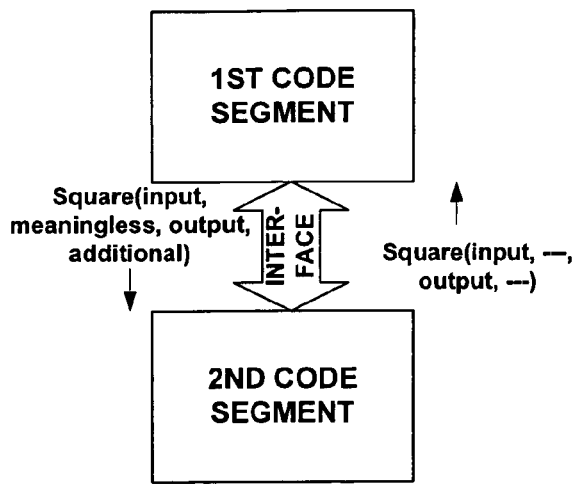
Figure 10:
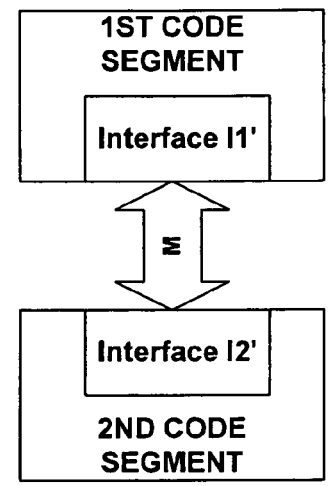

In some cases, it may be possible to ignore, add or redefine certain aspects (e.g., parameters) of a programming interface while still accomplishing the intended result. This is illustrated in FIGS. 9 and 10. For example, assume interface Interface1 of FIG. 5 includes a function call Square (input, precision, output), a call that includes three parameters, input, precision and output, and which is issued from the $1^{st}$ Code Segment to the $2^{nd}$ Code Segment. If the middle parameter precision is of no concern in a given scenario, as shown in FIG. 9, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 10, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

Figure 11:
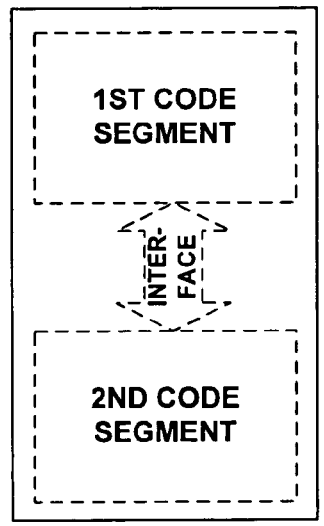
Figure 12:
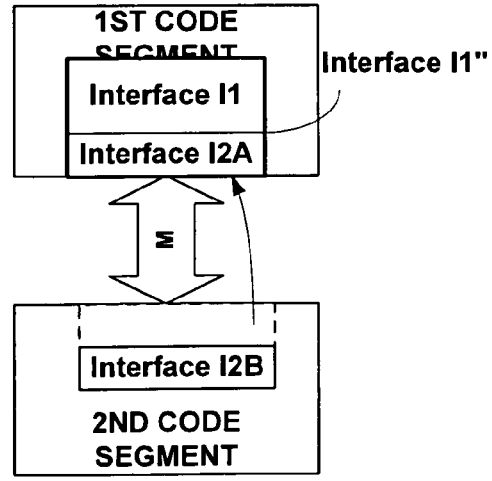

It may also be feasible to merge some or all of the functionality of two separate code modules such that the "interface" between them changes form. For example, the functionality of FIGS. 5 and 6 may be converted to the functionality of FIGS. 11 and 12, respectively. In FIG. 11, the previous $1^{st}$ and $2^{nd}$ Code Segments of FIG. 5 are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 12, part (or all) of interface I2 from FIG. 6 may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 6 performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 13:
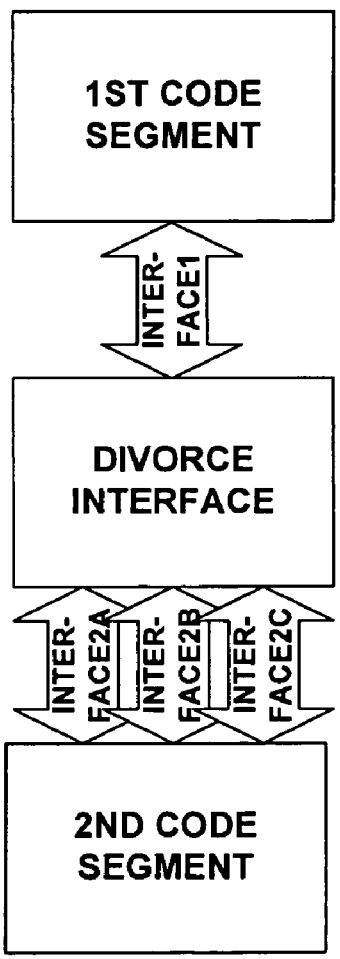
Figure 14:
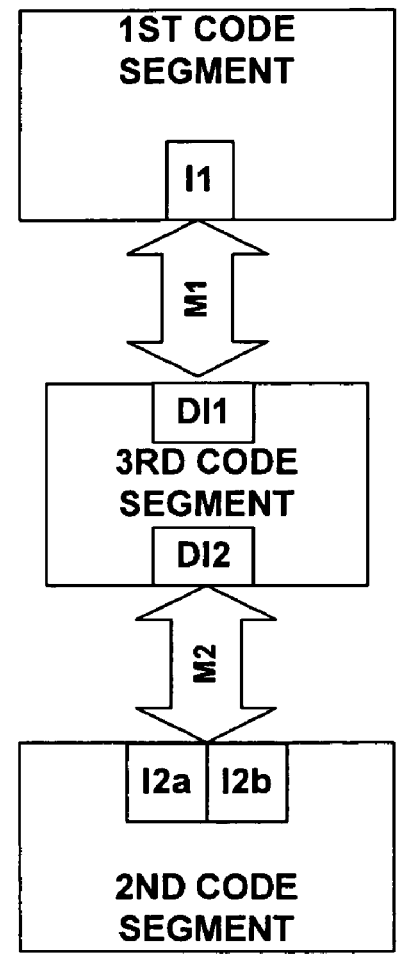

A communication from one code segment to another may be accomplished indirectly by breaking the communication into multiple discrete communications. This is depicted schematically in FIGS. 13 and 14. As shown in FIG. 13, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 14, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 6 to a new operating system, while providing the same or similar functional result.

E. Rewriting

Figure 15:
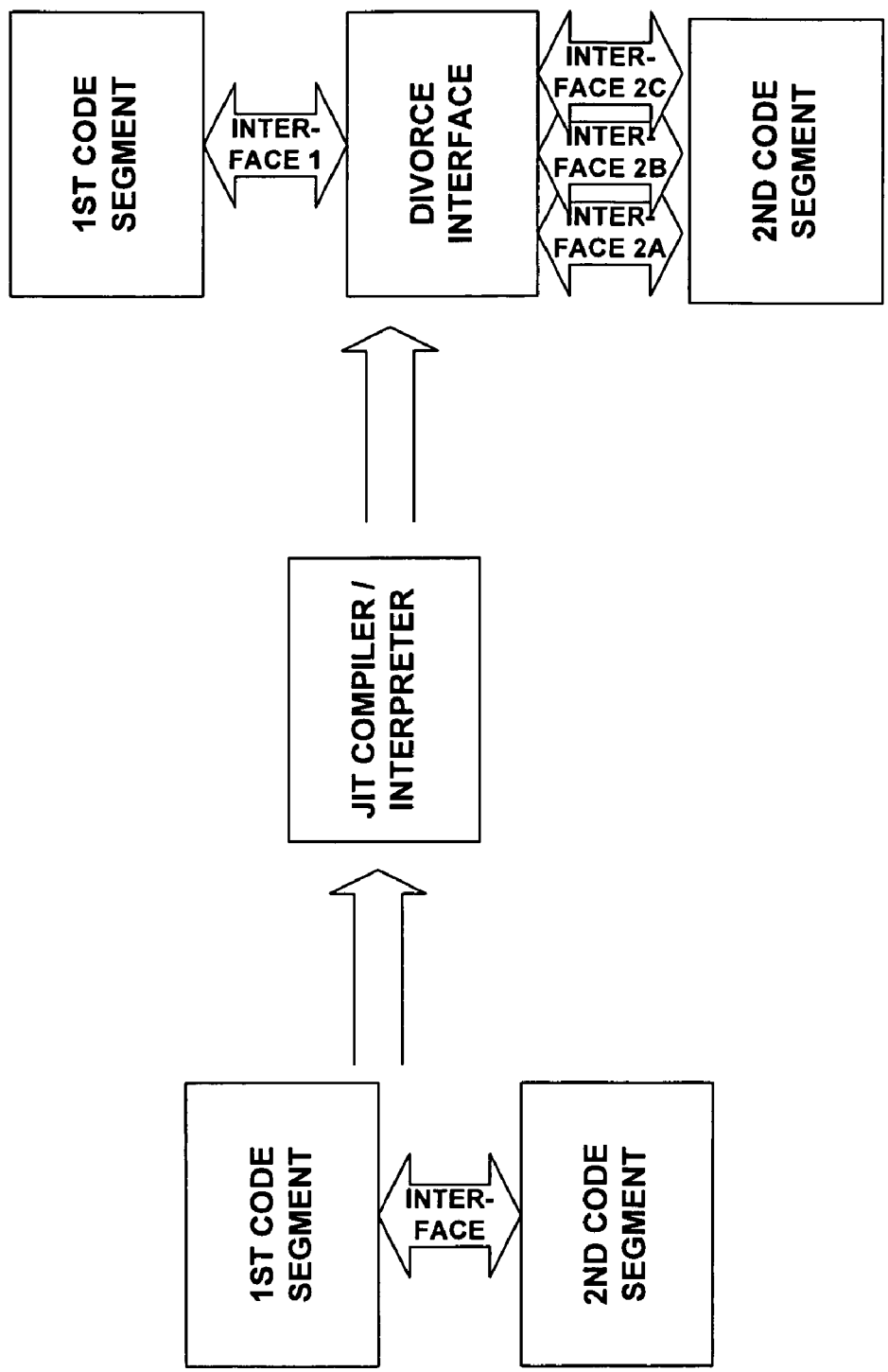
Figure 16:
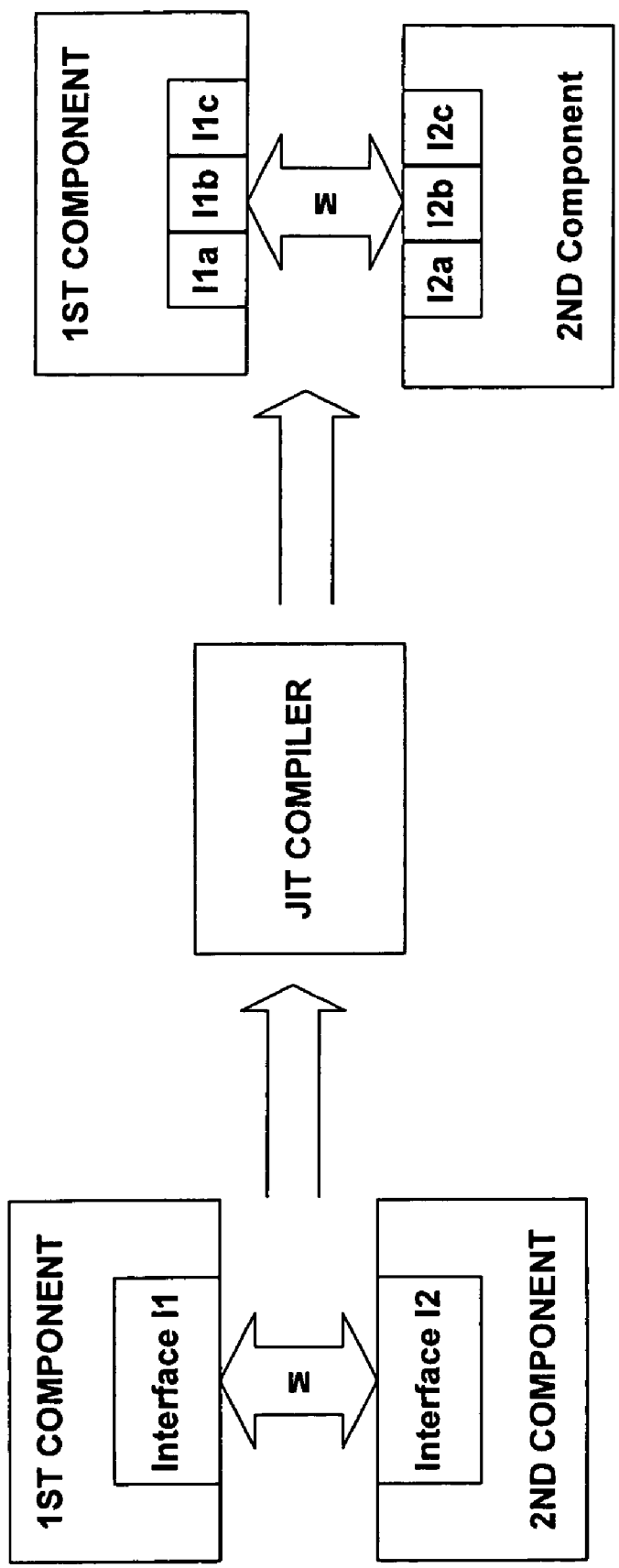

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 15 and 16. As can be seen in FIG. 15, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 16, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 5 and 6. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method, executed by a central processing unit, of organizing a set of types for a user interface into a hierarchical namespace, the method comprising:
    creating a plurality of groups from the set of types, each group containing at least one type that exposes logically related functionality;

assigning a name to each group in the plurality of groups, a first group includes functionality related to re-useable user interface controls, a second group includes functionality related to re-useable user interface dialogs and re-useable user interface wizards, and a third group includes functionality related to extending functionality of a user interface desktop;

selecting a top level identifier and prefixing the name of each group with the top level identifier in which the types in each group are referenced by a hierarchical name that includes the selected top level identifier prefixed to the name of the group containing the type;

providing the functionality of the user interface desktop, which includes allowing a sidebar to provide a capability of dynamic communication access in an integrated interactive display within which communication contacts and informational elements are dynamically tracked or received and being provided to a user on an ongoing basis, the capability being provided via at least one tile displayed in the sidebar of a display device, at least one or more tiles describe the communication contacts and informational elements of interest;

providing instructions to determine which of the communication contacts or which of the informational elements is to be represented by the at least one or more tiles; and providing a user context system to determine if a notification related to the communication contacts or the informational elements represented by the at least one or more tiles should be delivered at the sidebar, deferred and delivered later at the sidebar, denied delivery at the sidebar, or routed to another system for delivery, the determination based on a user context; and providing pointers to one or more services for accessing and/or interacting with the communication contacts and the informational elements, the one or more services automatically interact, track, or receive a status of the communication contacts or a status of the informational elements in which the one or more services may be used simultaneously by the at least one or more tiles.

2. A method as recited in claim 1, wherein yet another of the groups in the plurality includes functionality related to extending user interface functionality.

3. A method as recited in claim 2, wherein the functionality related to extending user interface functionality comprises:
a first functionality to allow additions to context menus;
a second functionality to allow application-identification of the at least one or more tiles; and
a third functionality to allow calculations to be performed when displaying information regarding one or more files or folders.

4. A method as recited in claim 2, wherein the assigning comprises assigning a name of Addin to the group that includes functionality related to extending user interface functionality so that the hierarchical name for the group that includes functionality related to extending user interface functionality is System.Windows.Explorer.Addin.

5. A method as recited in claim 1, wherein the functionality related to extending functionality of the user interface desktop comprises:
a first functionality to allow the sidebar to be displayed on the user interface desktop; and
a second functionality to allow application-defined notifications to be displayed on the user interface desktop.

6. A method as recited in claim 1, wherein the assigning comprises assigning a name of Desktop to the group that includes functionality related to extending functionality of the user interface desktop so that the hierarchical name for the group that includes functionality related to extending functionality of the user interface desktop is System.Windows.Explorer.Desktop.

7. A method as recited in claim 1, wherein the assigning comprises assigning a name of Controls to the group that includes functionality related to re-usable user interface controls so that the hierarchical name for the group that includes functionality related to re-usable user interface controls is System.Windows.Explorer.Controls, and assigning a name of Dialogs to the group that includes functionality related to re-useable user interface dialogs and re-useable user interface wizards so that the hierarchical name of the group that includes functionality related to re-useable user interface dialogs and re-useable user interface wizards is System.Windows.Explorer.Dialogs.

8. A method as recited in claim 1, wherein the functionality related to re-useable user interface controls comprises:
a first control that encapsulates a storage user experience;
a second control that allows an item to be displayed in an application-defined manner;
a third control that allows items to be added to a list; and
a fourth control that allows preview images of items to be displayed.

9. A method as recited in claim 1, wherein the functionality related to re-useable user interface dialogs and re-useable user interface wizards comprises:
a first dialog to allow files and folders to be opened and saved;
a first wizard to allow optical discs to be written to; and
a second wizard to facilitate sending images by electronic mail.

10. A method executed by a central processing unit, the method comprising:
creating a first namespace with functions that enable extending functionality of a user interface; and
creating a second namespace with functions that enable extending functionality of a desktop of the user interface, the functions provide access to a customizable thumbnail displayed on a portion of an interactive display, the customizable thumbnail comprises a combination of tiles in which at least one or more tiles describe communication contacts or informational elements of interest;
the functions further track or receive the communication contacts and the informational elements in the interactive display while being provided to a user in an ongoing basis;
the functions further provide instructions to identify the communication contacts or the informational elements to be represented by the at least one or more tiles;
the functions further provide a user context system to determine if a notification related to the communication contacts or the informational elements represented by the tiles should be delivered at the thumbnail, deferred and delivered later at the thumbnail, denied delivery at the thumbnail, or routed to another system for delivery, the determination based on at least one element of the notification; and
the functions further provide pointers to one or more services to access and to interact with the communication contacts and the informational elements in which the one or more services automatically interact, track, or receive a status of the communication contacts or a status of the informational elements such that the one or more services may be used alone or in combination by the at least one or more tiles.

11. A method as recited in claim 10, further comprising:
creating a third namespace with functions that enable reusable user interface controls.

12. A method as recited in claim 11, wherein the third namespace includes:
a first control that encapsulates a storage user experience;
a second control that allows an item to be displayed in an application-defined manner;
a third control that allows items to be added to a sidebar of the desktop;
a fourth control that allows items to be added to a list; and
a fifth control that allows preview images of items to be displayed.

13. A method as recited in claim 10, further comprising:
creating a third namespace with functions that enable user interface dialogs and user interface wizards.

14. A method as recited in claim 13, wherein the third namespace includes:
a first dialog to allow files and folders to be opened and saved;
a first wizard to allow optical discs to be written to; and
a second wizard to facilitate sending images by electronic mail.

15. A method as recited in claim 10, wherein the first namespace includes:
a first functionality to allow additions to context menus;
a second functionality to allow identification of application-defined tiles; and
a third functionality to allow calculations to be performed when displaying information regarding one or more files or folders.

16. A method as recited in claim 10, wherein the second namespace includes:
a first functionality to allow a sidebar to be displayed on the desktop; and
a second functionality to allow application-defined notifications to be displayed on the desktop.

17. A method executed by a central processing unit, the method comprising:
calling one or more first functions to use controls of a user interface;
calling one or more second functions to extend functionality of the user interface; and
calling one or more third functions to extend functionality of a desktop of the user interface, the one or more third functions to provide:
awareness to information in an interactive display via a dynamic thumbnail displayed in an entire display in which the dynamic thumbnail comprises a combination of tiles such that at least one or more tiles describe communication contacts and informational elements of interest, and to track or to receive the communication contacts and the informational elements while being provided to a user on an ongoing basis;
a user context system to determine if a notification related to the communication contacts or the informational elements represented by the combination of tiles should be delivered at the dynamic thumbnail, deferred and delivered later at the dynamic thumbnail, denied delivery at the dynamic thumbnail, or routed to another system for delivery, the determination based on a user context and predetermined rules; and
pointers to one or more services to automatically interact, track, or receive a status of the communication contacts and a status of the informational elements, such that the one or more services may be used simultaneously by the at least one or more tiles.

18. A method as recited in claim 17, wherein the functions to extend functionality of the desktop include:
one or more functions to allow a sidebar to be displayed on the desktop; and
one or more functions to allow application-defined notifications to be displayed on the desktop.

19. A method as recited in claim 17, further comprising:
calling the one or more third functions to use dialogs and wizards of the user interface.

20. A method as recited in claim 19, wherein the functions to use dialogs and wizards of the user interface include:
one or more functions to use a dialog to allow files and folders to be opened and saved;
one or more functions to use a wizard to allow optical discs to be written to; and
one or more functions to use another wizard to facilitate sending images by electronic mail.

21. A method as recited in claim 17, wherein the functions to use controls of the user interface include:
one or more functions that encapsulate a storage user experience;
one or more functions that allow an item to be displayed in an application-defined manner;
one or more functions that allow items to be added to a list; and
one or more functions that allow preview images of items to be displayed.

22. A method as recited in claim 17, wherein the functions to extend functionality of the user interface include:
one or more functions to allow additions to context menus;
one or more functions to allow identification of application-defined thumbnails; and
one or more functions to allow calculations to be performed when displaying information regarding one or more files or folders.

* * * * *